United States Patent
Chrzanowski et al.

(10) Patent No.: US 8,168,688 B2
(45) Date of Patent: May 1, 2012

(54) PROCESS OF RECYCLING PAINT SLUDGE AND COMPONENT MADE THEREOF

(76) Inventors: Dan Chrzanowski, Clinton Twp, MI (US); Brandon Chrzanowski, St. Clair Shores, MI (US)

( * ) Notice: Subject to any disclaimer, the term of this patent is extended or adjusted under 35 U.S.C. 154(b) by 427 days.

(21) Appl. No.: 12/399,583

(22) Filed: Mar. 6, 2009

(65) Prior Publication Data

US 2009/0275687 A1    Nov. 5, 2009

Related U.S. Application Data

(60) Provisional application No. 61/034,308, filed on Mar. 6, 2008.

(51) Int. Cl.
*C08J 11/04* (2006.01)

(52) U.S. Cl. ............. 521/40; 521/40.5; 521/41; 521/46; 521/47.5; 521/48; 521/49; 521/49.8; 528/502 R; 528/502 C; 528/502 F; 264/37.25; 264/37.26; 264/37.27; 264/239; 134/38

(58) Field of Classification Search .................... 521/40, 521/40.5, 41, 44.5, 45, 46, 46.5, 47, 47.5, 521/48, 49, 49.8; 528/480, 502 R, 502 A, 528/502 C, 502 F, 503; 134/38; 210/634, 210/654, 749; 264/37.25, 37.26, 37.27, 239, 264/299, 319, 328.1

See application file for complete search history.

(56) References Cited

U.S. PATENT DOCUMENTS 4,303,559 A * 12/1981 Trost ............................ 521/40.5
5,160,628 A * 11/1992 Gerace et al. ................. 210/667

FOREIGN PATENT DOCUMENTS

JP    2004-100066    *  9/2004

OTHER PUBLICATIONS

Dewrwent abstract of JP 2004-100066.*

* cited by examiner

*Primary Examiner* — James J Seidleck
*Assistant Examiner* — Frances Tischler
(74) *Attorney, Agent, or Firm* — Gifford, Krass, Sprinkle, Anderson & Citkowski, P.C.

(57) ABSTRACT

A process for making a solid component out of recycled paint sludge is provided. The process can include providing a paint sludge and providing a second material. Thereafter, the paint sludge and the second material are mixed to produce a paint sludge-second material mixture. The paint sludge-second material mixture is processed in order to produce a polymer containing precursor. The processing can include granulating or densifying the paint sludge-second material mixture. After the precursor has been produced, it can be placed within a molding machine and a solid component is molded. The molding machine can be an injection molding machine, an extrusion molding machine or a blow molding machine.

10 Claims, 3 Drawing Sheets

PROCESS OF RECYCLING PAINT SLUDGE AND COMPONENT MADE THEREOF

CROSS-REFERENCE TO RELATED APPLICATIONS

This application claims priority of U.S. Provisional Patent Application Ser. No. 61/034,308 filed Mar. 6, 2008, which is incorporated herein by reference.

FIELD OF THE INVENTION

The present invention is related to a process for recycling paint sludge. In particular, the present invention is related to a process for recycling paint sludge in which a solid component can be made therefrom.

BACKGROUND OF THE INVENTION

Paint is a commonly manufactured and used substance with millions of tons produced and used every year. As such, paint waste, often referred to and/or in the form of paint sludge, exceeds thousands of tons every year and can create a variety of environmental and economic problems. In addition, increasingly stringent governmental pollution regulations as well as the cost of waste disposal have led to increased concerns regarding the treatment and disposal of paint sludge.

Paint sludge can include a variety of uncured polymer resins, pigments, curing agents, surfactants and other minor formulation ingredients. In addition, the paint sludge can contain water and/or a variety of organic solvents. Heretofore methods have attempted to recycle paint sludge with limited success. As such, most paint sludge is disposed of in appropriate waste landfills. Therefore, a method for recycling paint sludge that is economical and useful for the manufacture of usable components would be desirable.

SUMMARY OF THE INVENTION

A process for making a solid component out of recycled paint sludge is provided. The process can include providing a paint sludge and providing a second material, the paint sludge being a product of excess paint resulting from the painting of an object. The paint sludge and the second material can be mixed to produce a paint sludge-second material mixture and the paint sludge-second material mixture can be processed in order to produce a precursor polymer in the form of particles, granules, flakes and the like. The processing can include granulating or densifying the paint sludge-second material mixture. After the precursor has been produced, it is placed within a molding machine and a solid component is molded. The molding machine can be an injection molding machine, an extrusion molding machine or a blow molding machine. It is appreciated that a third material, a fourth material and additional materials can also be mixed with the paint sludge.

The paint sludge can be collected from excess automotive paint, however this is not required. In some instances the paint is oil-based paint with binders made from synthetic resins such as resin derived from petroleum, including alkyds, polyurethanes, silicones and the like. In other instances the paint is water-based paint with binders such as acrylic resins, polyvinyl acetate, styrene butadiene and the like. In addition, excess paint containing polypropylene can be collected. The second material can be a virgin material such as a virgin polymer. In addition, the second material can contain recycled material such as a recycled polymer.

In some instances, the paint sludge-second material mixture has a paint sludge content of between 1 to 99 weight percent. In other instances, the paint sludge content is between 10 to 90 weight percent, 20 to 80 weight percent, 30 to 70 weight percent or 40 to 60 weight percent. The solid component can have a density of greater than 80 percent and in some instances a density greater than 85 percent. In addition, the solid component can be in the form of a pallet, milk crate, dunnage and the like.

DETAILED DESCRIPTION OF THE INVENTION

Figure 1:
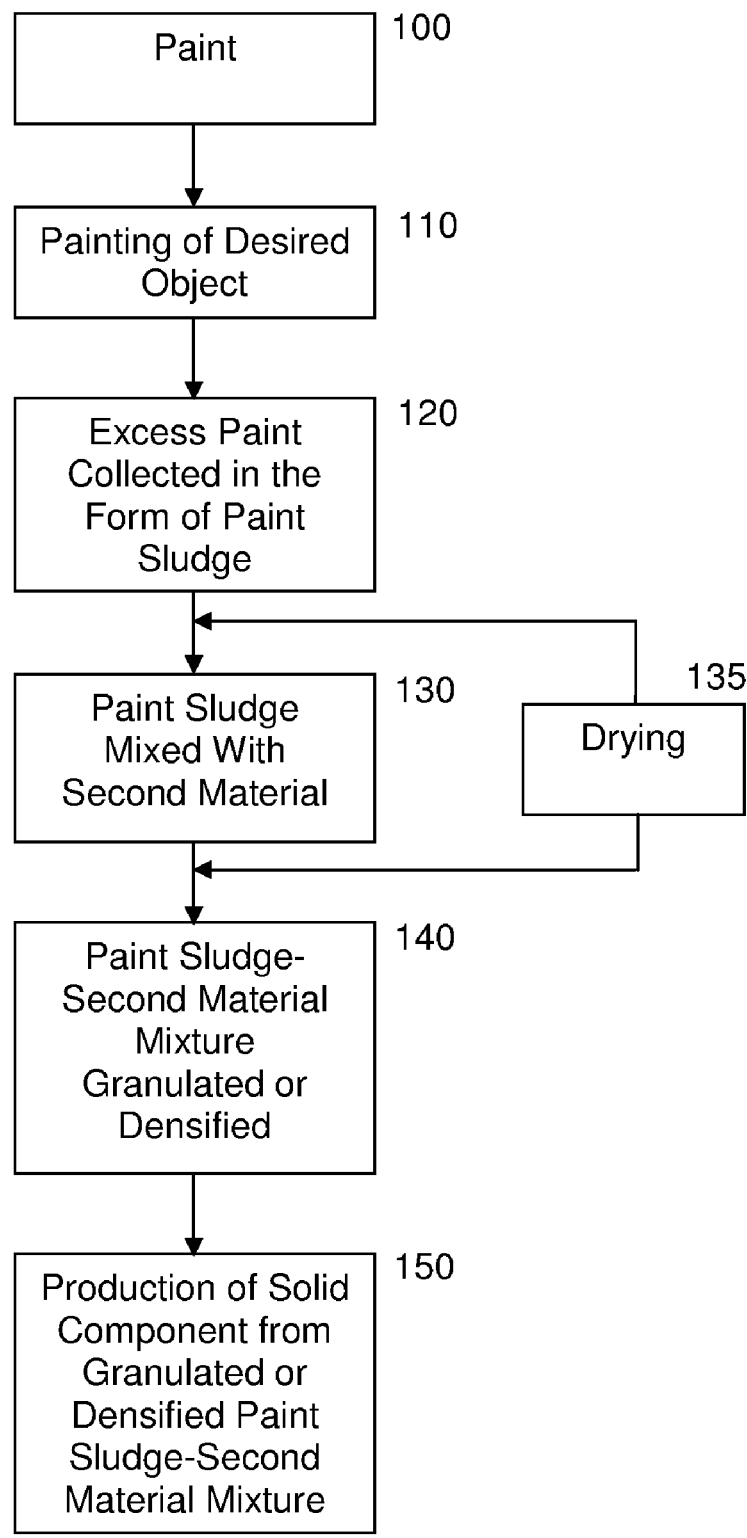
FIG. 1 is a schematic diagram of a process for producing a solid component from recycled paint sludge according to an embodiment of the present invention.

The present invention includes a process for recycling paint sludge. As such, the process has utility for reducing waste sent to and placed in landfills.

The process includes taking paint sludge and mixing it with a second material, taking the paint sludge-second material mixture and granulating or densifying it, and then producing a solid component from the granulated or densified paint sludge-second material mixture. It is appreciated that other types of processes besides granulating or densifying can be used to transform the paint sludge into a form or structure that can be fed into a machine that produces the solid component. It is further appreciated that the term "solid component" as used herein is defined as a component that has one or more physical dimensions that do not change when the component is placed unconstrained on a flat surface.

The second material can be a polymer, a natural fiber, paper and the like. The polymer, natural fiber and/or paper can be virgin material or recycled material. If the material is recycled, it can include recycled material from filter media, motor vehicle components, carpet, tires, furniture, building products, plastic bags, household items, and the like.

The granulating of the paint sludge-second material mixture can be performed with a granulator. A granulator can have a closed chamber with one or more electric motors that turn a rotor with cutting knives attached thereto. As the paint sludge-second material mixture enters the closed chamber, the rotor sweeps by and cuts the material between a fixed position knife and one or more rotating blades. The paint sludge-second material mixture remains within the closed chamber until it is cut into a size that can pass through a filter such as a screen. Pressurized air can provide cooling and facilitate material flow through the closed chamber with finished granules or particle sizes typically ranging from 0.125 inches to 0.375 inches.

The material can also be densified using a densifier. A densifier, also known as an agglomerator, can transform a relatively light and fluffy material into particles that are dense enough to feed into a hopper of an injection molding machine, extrusion molding machine and the like. The densifier typically has a cylinder with two blades that spin at one end of the cylinder and create friction with the material in the cylinder. The friction results in an increase of the temperature of the material until it reaches a softening point. Thereafter, water can be added to cool the material down, and after the water evaporates, the material can be discharged from the cylinder in the form of chips, particles, granules and the like.

The paint sludge can be obtained from paint used in most any industrial setting, for example and for illustrative purposes only, excess paint resulting from the painting of motor vehicles within a motor vehicle assembly facility. In addition, the paint sludge can be obtained from excess paint used in a residential setting. As such, the paint sludge can be obtained from oil-based paint and/or water-based paint.

The paint can include a pigment, a binder, a solvent and/or other additives. It is appreciated that pigment gives the paint its color whereas a binder is used to hold pigment material together and keep them in a solid state until attached to a surface. Paint solvents such as thinners and reducers can transform a solid pigment and binder materials into sprayable liquids and for the most part evaporate into the atmosphere after spraying of the paint. In some instances, paint can be applied as a very fine powder and then baked at high temperature.

Pigments can be classified as either natural or synthetic. Natural pigments can include various clays, calcium carbonate, mica, silicas, talcs and the like. Synthetic type pigments can include engineered molecules, calcined clays, blanc fix, precipitated calcium carbonate, synthetic silicas and the like. Fillers may be present as part of a pigment and typically include cheap and inert materials such as talc, lime, baryte, clay, etc.

As stated above, the binder binds the pigments together and can impart adhesion and strongly influence properties of the paint such as gloss potential, exterior durability, flexibility and toughness. Binders can include synthetic or natural resins such as acrylics, polyurethanes, polypropylenes, polyesters, melamine resins, epoxy or oils. If an activator or hardener is included within the paint, the activator can include ethyl acetate, toluene, aliphatic polyisocyanate, hexamethylene diisocyanate and the like. Clear coats can include methyl ethyl ketone, toluene, mixed dibasic esters, petroleum naphtha and the like. Thinners, if present, can include butyl acetate, ethyl benzene, toluene/xylene, methyl ethyl ketone and the like. Base coats can include methyl ethyl ketone, titanium dioxide, metallic pigments, xylene and the like. And primers can include barium sulfate, resins and fillers, toluene/xylene, isocyanates and the like.

If the second material contains a filter media, the filter media can be obtained from new filter media products and/or recycled filter media. If recycled filter media is used, filter media supplied by one or more methods disclosed in commonly assigned U.S. patent application Ser. No. 12/258,284 filed on Oct. 24, 2008, and incorporated herein in its entirety by reference can be used. A third material, a fourth material, etc. can also be mixed with the paint sludge and be used to modify the chemical, mechanical and/or physical properties of the solid component that is produced with the recycled paint sludge. For example and for illustrative purposes only particles, fibers, flakes and the like made from glass, carbon, SiC, SiN, etc. can be mixed with the paint sludge to make a solid component.

The ratio of paint sludge to second material can be adjusted depending upon the solid component to be made therefrom, with weight percentages ranging from 1 to 99 weight percent paint sludge and 99 to 1 weight percent second material. In some instances, the paint sludge-second material mixture and/or the solid component can have a paint sludge content of between 10 to 90 weight percent. In other instances, the paint sludge content can be between 20 to 80 weight percent, 30 to 70 weight percent or 40 to 60 weight percent. It is appreciated that the remainder of the paint sludge-second material mixture and/or the component is made from the second material and/or any additional fillers that may be included to decrease cost, improve mechanical properties, improve chemical properties and the like. The solid component can have a density of greater than 80 percent and in some instances a density greater than 85 percent. It is appreciated that one skilled in the art will understand that the density percentage is a comparison to a theoretical density, e.g. 80 percent of theoretical density.

Turning now to FIG. 1, an embodiment of a process to recycle paint sludge is disclosed with paint being supplied at step 100. The paint is used to coat, paint, etc. desired objects at step 110 and excess paint is collected in the form of paint sludge, also known as paint kill or d-tac, at step 120. The paint sludge is mixed with a second material at step 130 and the paint sludge plus second material mixture can be processed in a variety of ways such that pellets, granules, chips, small rods and the like can be used in a plastic molding machine to form desired items. The paint sludge can also be mixed with a third material, a fourth material and the like in order to obtain desired chemical, physical and/or mechanical properties in a manufactured solid component. In some instances, the paint sludge and second material mixture can be granulated or densified as illustrated at step 140. Thereafter, the production of desired solid components such as household items, automotive components, industrial components and the like is afforded at step 150.

It is appreciated that the paint sludge and/or the paint sludge mixed with the second material can be optionally dried at step 135 using any drying process and/or drying machinery known to those skilled in the art. The drying can result in the removal of excess water, volatile liquids and vapors, undesirable smells and the like from the paint sludge and/or paint sludge mixed with the second material and can include one or more drying steps. In addition, the drying can be performed using a sludge dryer, an oven, a conveyor belt with a heat lamp and the like. It is appreciated that air scrubbers, fuming hoods and the like can also be used to properly process any gases, vapors, etc., that may evolve from the paint sludge before, during and/or after drying. It is further appreciated that the drying of the paint sludge and/or the paint sludge mixed with the second material can result in paint sludge that is easier to handle, ship, process and the like.

Figure 2:
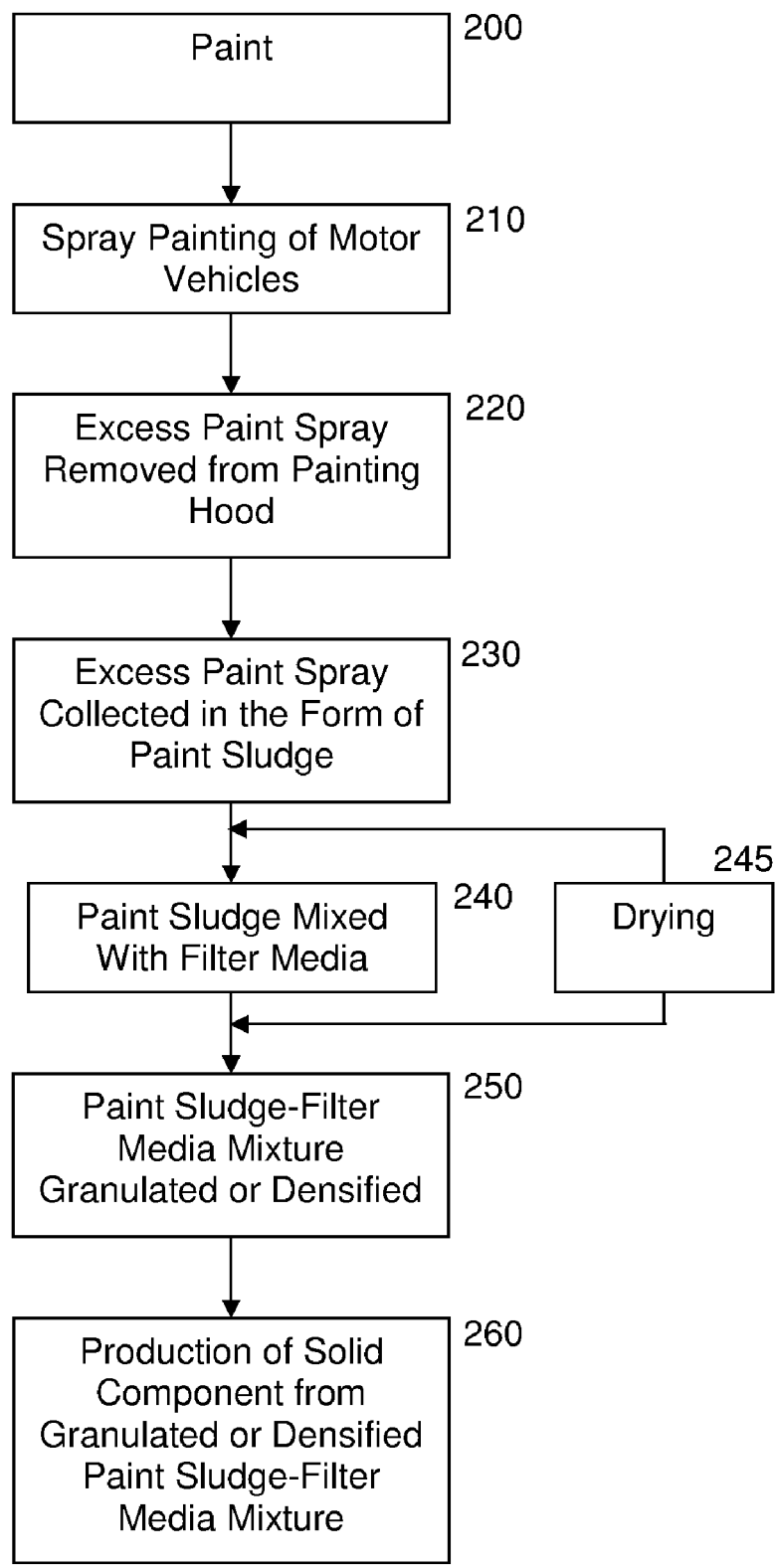
FIG. 2 is a schematic diagram of a process for producing a solid component from recycled paint sludge according to another embodiment of the present invention.

Turning now to FIG. 2, paint supplied at step 200 is used to spray paint motor vehicles at step 210 with excess paint spray removed from the painting environment (hereafter referred to as the painting booth) within an automotive assembly facility at step 220. The excess paint spray is collected in the form of paint sludge at step 230 and then mixed with a filter media material at step 240. An optional drying step of the paint sludge and/or the paint sludge mixed with the filer media as discussed above can be provided at step 245. Similar to the embodiment shown in FIG. 1, the paint sludge-filter media mixture is granulated or densified at step 250 and solid components are produced using the granulated or densified paint sludge-filter media mixture at step 260. In some instances, the granulation or densification of the paint sludge-filter media mixture at step 250 produces granules or pellets containing polymer that fit or pass through a wire screen. The wire screen can have specific sized openings, for example $3/16$, $3/8$ or $1/2$ inch screen. These granules or pellets are then placed within a polymer molding machine and through compression and/or heating used to mold a desired component. Molding methods such as injection molding, extrusion molding, blow molding, thermal blow molding, thermal form molding and/or compression molding can be used to produce desired solid components with the granulated and/or densified paint sludge-second material mixture disclosed herein.

Figure 3:
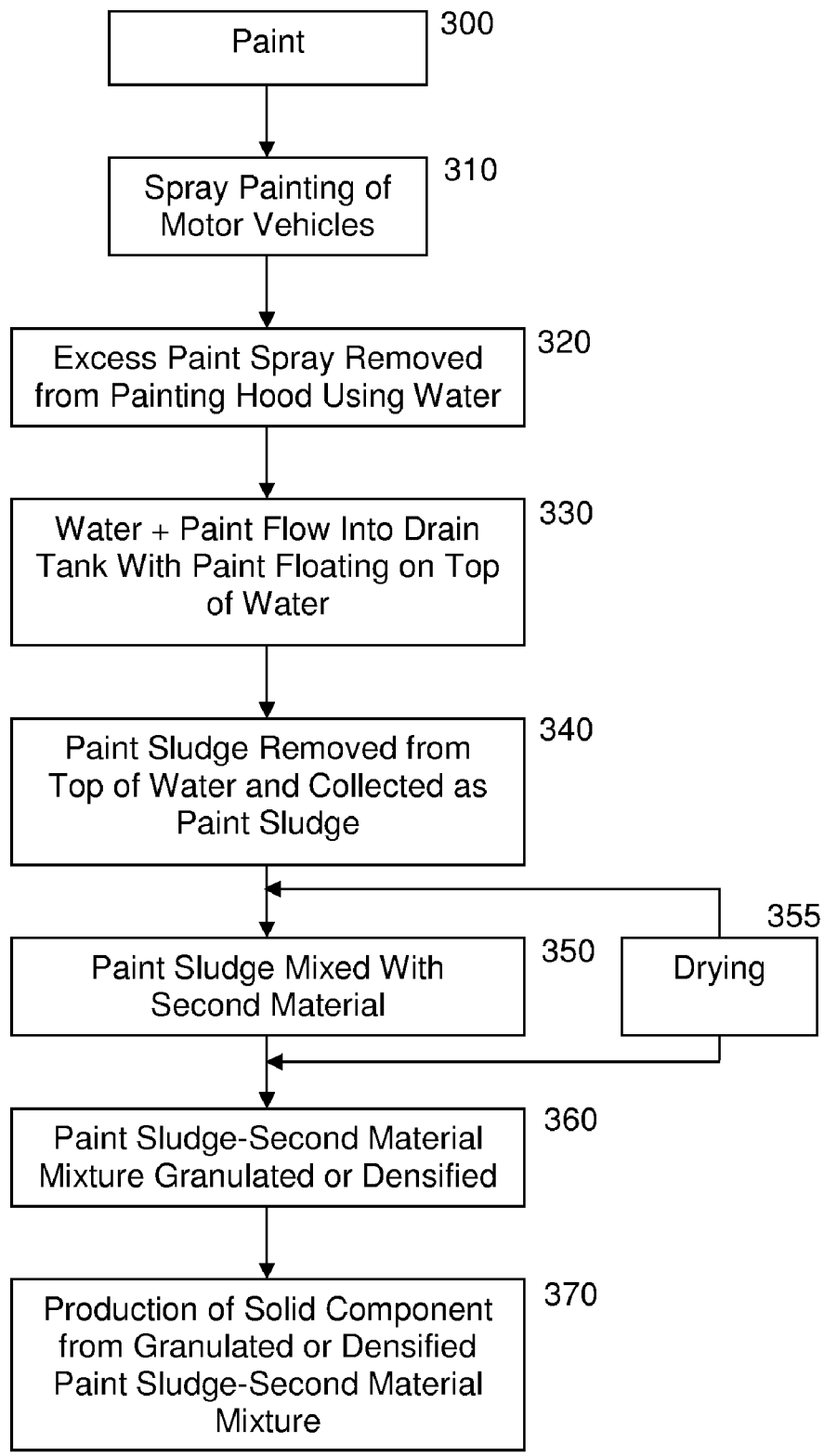
FIG. 3 is a schematic diagram of a process for producing a solid component from recycled paint sludge according to yet another embodiment of the present invention.

Another embodiment is illustratively shown in FIG. 3 wherein paint supplied at step 300 is used to paint motor vehicles at step 310 and excess paint removed from the painting booth at step 320. The paint is removed from the painting booth using water and the water plus paint then flow into a drain tank at step 330. It is appreciated that the term "water" as used herein can include generally plain water or a water mixture such as a water/chemical mixture and the like. The drain tank contains water with the paint floating on the top of the water surface.

The paint is removed from the top of the water and collected as paint sludge at step 340. The paint sludge can be collected in a sludge tank after it has been removed from the drain tank. In some instances the paint sludge is at least partially dried in the sludge tank and filter media can be used in the sludge tank to assist in the drying and/or any other subsequent desirable processing of the paint sludge. It is appreciated that the paint sludge that is collected at step 340 may or may not include filter media and for the purposes of the present invention, the term "paint sludge" can include paint sludge with filter media therein. After the paint sludge is collected, and any desired processing of the paint sludge known to those skilled in the art performed thereon, the paint sludge is mixed with a second material at step 350. It is appreciated that the second material can be a filter media, however this is not required. In addition, the paint sludge and/or paint sludge-second material mixture can be dried at optional step 345 as discussed above.

Mixing of the paint sludge with the second material can include one or more steps wherein the paint sludge is placed proximate to the second material such that the paint sludge and second material can be placed within a granulator or densifier. In addition, a third material, fourth material and the like can be mixed with the paint sludge as discussed above. The paint sludge-second material mixture is granulated or densified at step 360 with pellets and/or granules produced. Production of items from the granulated or densified paint sludge-second material mixture is afforded at step 370 using a molding machine. In one instance, 65 to 75 weight percent paint sludge is mixed with 25 to 35 weight percent filter media in a densifier, the densifier operated for 1 to 30 minutes until pellets are formed. Thereafter, pellets from the densifier are melted and processed with a compression mold machine in order to form a molded component.

It is appreciated that paint sludge from most any type of paint, not just automotive paint, can be used in the process disclosed herein. In addition, filter media obtained and/or recycled, in addition to virgin filter media, can be used, as well as recycled paper and material obtained from recycled motor vehicle components, carpet, tires, furniture, building products, plastic bags, household items and the like.

It is to be understood that various modifications are readily made to the embodiments of the present invention described herein without departing from the spirit and scope thereof. Accordingly, it is to be understood that the invention is not to be limited by the specific illustrated embodiment or embodiments, but by the scope of the appended claims.

We claim:

1. A process for making a solid component out of recycled paint sludge, the process comprising:
   providing paint sludge;
   providing a second material in the form of a recycled polymer filter media;
   mixing the paint sludge with the second material to produce a paint sludge-second material mixture;
   processing the paint sludge-second material mixture, the processing selected from the group consisting of granulating and densifying, the processing producing a precursor made from recycled paint sludge;
   placing the precursor in a molding machine, the molding machine selected from the group consisting of an injection molding machine, an extrusion molding machine a blow molding machine, a thermal blow molding machine, a thermal form molding machine and compression molding machine; and
   molding a solid component from the precursor.

2. The process of claim 1, wherein the paint sludge is from an oil-based paint.

3. The process of claim 1, wherein the paint sludge is from a water-based paint.

4. The process of claim 1, wherein the paint sludge-second material mixture has a paint sludge content of between 1 to 99 weight percent.

5. The process of claim 4, wherein the paint sludge content is between 20 to 80 weight percent.

6. The process of claim 5, wherein the paint sludge content is between 30 to 70 weight percent.

7. The process of claim 1, wherein the solid component has a density of greater than 80 percent of theoretical density.

8. The process of claim 7, wherein the solid component has a density of greater than 85 percent of theoretical density.

9. The process of claim 1, wherein the paint sludge is obtained from paint used to paint a motor vehicle.

10. The process of claim 1, wherein the paint sludge is obtained from paint used to paint a motor vehicle on an automotive assembly line.

* * * * *